(12) United States Patent
Park et al.

(10) Patent No.: US 12,147,668 B2
(45) Date of Patent: Nov. 19, 2024

(54) STORAGE DEVICE

(71) Applicant: SK hynix Inc., Gyeonggi-do (KR)

(72) Inventors: Ie Ryung Park, Gyeonggi-do (KR);
Dong Sop Lee, Gyeonggi-do (KR);
Youn Won Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 129 days.

(21) Appl. No.: 17/903,557

(22) Filed: Sep. 6, 2022

(65) Prior Publication Data
US 2023/0073148 A1 Mar. 9, 2023

(30) Foreign Application Priority Data

Sep. 6, 2021 (KR) .................. 10-2021-0118233
Aug. 3, 2022 (KR) .................. 10-2022-0096989

(51) Int. Cl.
G06F 12/00 (2006.01)
G06F 3/06 (2006.01)
G06F 11/10 (2006.01)

(52) U.S. Cl.
CPC ............ *G06F 3/061* (2013.01); *G06F 3/0635* (2013.01); *G06F 3/0658* (2013.01); *G06F 3/0679* (2013.01); *G06F 11/1096* (2013.01)

(58) Field of Classification Search
None
See application file for complete search history.

(56) References Cited

U.S. PATENT DOCUMENTS 8,588,003 B1 * 11/2013 Weingarten ......... G11C 11/5628
365/185.02
11,042,307 B1 6/2021 Li
2013/0205073 A1 * 8/2013 Hwang ................ G06F 3/0649
365/185.03

FOREIGN PATENT DOCUMENTS

KR 10-1530997 B1 6/2015

* cited by examiner

Primary Examiner — Daniel D Tsui
(74) Attorney, Agent, or Firm — IP & T GROUP LLP

(57) ABSTRACT

A storage device includes a memory device including one or more memory blocks including first sub-areas and second sub-areas configured to store higher level data than the first sub-areas, and a controller configured to use the first sub-areas before the second sub-areas in order to store data in the memory device.

14 Claims, 11 Drawing Sheets

→ : ORDER OF WRITING

▢ : WRITTEN

: WRITTEN

FIG. 7

| | | | | | | |
|---|---|---|---|---|---|---|
| G1 | SB1 | DT11 | DT12 | | | DT18 |
| | SB2 | | | | | |
| G2 | SB1 | DT21 | DT22 | | | DT28 |
| | SB2 | | | | | |
| ⋮ | ⋮ | | | ⋮ | | |
| Gn | SB1 | | | | | |
| | SB2 | | | | | |

MB1

| PD1 | PD2 | |
|---|---|---|
| | | |

PMB

▓ : WRITTEN

: WRITTEN

: WRITTEN

STORAGE DEVICE

CROSS-REFERENCES TO RELATED APPLICATION

The present application claims priority under 35 U.S.C. § 119(a) to Korean application number 10-2021-0118233, filed on Sep. 6, 2021 and Korean application number 10-2022-0096989, filed on Aug. 3, 2022, which are incorporated herein by reference in their entirety.

BACKGROUND

1. Technical Field

The present technology relates generally to semiconductor technology and, more specifically, to a storage device including a memory device.

2. Related Art

A storage device may be configured to store data provided from an external device, in response to a write request from the external device. The storage device may also be configured to provide the stored data to the external device in response to a read request from the external device. The external device may be an electronic device capable of processing data, Examples of suitable external devices may include a computer, a digital camera, a mobile phone, and the like. The storage device may operate by being embedded in the external device, or may be manufactured in a separable form and may operate by being connected to the external device. The storage device may include a memory device for storing data.

Examples of the data may include different types of data, for example, data that needs to be quickly stored in the memory device and data that does not need to be quickly stored in the memory device. When the storage device stores data in the memory device in an appropriate manner according to the type of data, the operation performance of the storage device may be maximized.

SUMMARY

Various embodiments of the present invention are directed to providing a storage device capable of quickly storing data in a memory device according to the type of data.

A storage device according to an embodiment of the present disclosure may include: a memory device including one or more memory blocks including first sub-areas and second sub-areas configured to store higher level data than the first sub-areas; and a controller configured to use the first sub-areas before the second sub-areas in order to store data in the memory device.

A storage device according to an embodiment of the present disclosure may include: a memory device including a memory block including first sub-areas and second sub-areas having a higher level than the first sub-areas; and a controller configured to use only the first sub-areas in order to store a first type of data.

A storage device according to an embodiment of the present disclosure may include: a memory device including a plurality of memory blocks each including first sub-areas and second sub-areas; and a controller configured to use, after a number of first memory blocks among the plurality of memory blocks reaches a first number, second sub-areas included in the first memory blocks to store data therein, wherein, in each of the first memory blocks, first sub-areas are full of data stored therein and the second sub-areas are empty.

A storage device according to an embodiment of the present disclosure may include: a memory device including memory units each logically divided into a lower priority region and a higher priority region; and a controller configured to control the memory device to store data preferentially into the higher priority region.

The controller may control the memory device further to store additional data into the lower priority region when the higher priority regions become full of the data stored therein within a first number of memory units among the memory units.

These and other features and advantages of the present invention will become apparent to those with ordinary skill in the art from the following detailed description of embodiments of the invention in conjunction with the following drawings.

BRIEF DESCRIPTION OF THE DRAWINGS

FIG. 7 is a simplified diagram for describing a method of managing parity data in accordance with an embodiment of the present disclosure.

DETAILED DESCRIPTION

Hereinafter, embodiments of the present disclosure will be described in detail with reference to the accompanying drawings.

Figure 1:
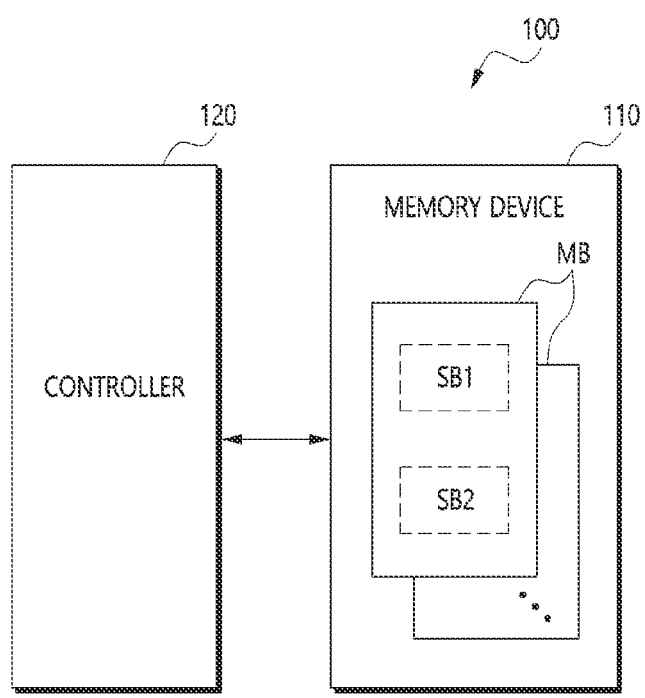
FIG. 1 is a simplified block diagram illustrating a storage device in accordance with an embodiment of the present disclosure.

FIG. 1 is a simplified block diagram illustrating a storage device 100 in accordance with an embodiment of the present disclosure.

The storage device 100 may be configured to store data received from an external device, in response to a write request from the external device. The storage device 100 may also be configured to provide the stored data to the external device in response to a read request from the external device.

Examples of the storage device 100 may include a personal computer memory card international association (PCMCIA) card, a compact flash (CF) card, a smart media card, a memory stick, various multimedia cards (MMC, eMMC, RS-MMC, and MMC-micro), a secure digital (SD) card (SD, Mini-SD, or Micro-SD), a universal flash storage (UFS), and a solid state drive (SSD).

The storage device 100 may include a memory device 110 and a controller 120.

The memory device 110 may operate in response to the control of the controller 120. Examples of the operation of the memory device 110 may include a read operation, a write operation (in other words, a program operation), and an erase operation.

The memory device 110 may include a memory cell array including a plurality of memory cells for storing data. Such a memory cell array may exist in a memory block MB.

The memory device 110 may include a plurality of memory blocks MB. Each of the memory blocks MB may include first sub-areas SB1 and second sub-areas SB2 having a higher level than the first sub-areas SB1. Each of the memory blocks MB may include multiple level cells such as multi-level cells (MLC) capable of 2-bit data (i.e., least significant bit (LSB) data and most significant bit (MSB) data), TLC capable of 3-bit data (i.e., LSB data, central significant bit (CSB) data and MSB data), and so forth. Each of the memory blocks MB may be logically divided into the first sub-areas SB1 and the second sub-areas SB2, the first sub-areas SB1 being configured to store therein less significant bit data and the second sub-areas SB2 being configured to store therein more significant bit data. In this disclosure, the second sub-areas SB2 configured to store therein more significant bit data may have the higher level than the first sub-areas SB1 configured to store therein less significant bit data. For example, the first sub-areas SB1 may store at least LSB data and the second sub-areas SB2 may store at least MSB data.

The memory device 110 may be implemented in various types such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a three-dimensional (3D) NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), and the like.

The controller 120 may control an overall operation of the storage device 100. The controller 120 may control the memory device 110 according to a request from the external device. For example, the controller 120 may write data to the memory device 110 according to a write request from the external device, and read the data from the memory device 110 according to a read request from the external device.

The controller 120 may also control the memory device 110 in order to perform an internally necessary management operation independently of the external device, that is, even without receiving a request from the external device. For example, the management 1o operation may include at least one of a wear leveling operation, a garbage collection operation, an erase operation, a read reclaim operation, and a refresh operation. The management operation may include an operation of writing data to the memory device 110 and reading the data from the memory device 110. According to an embodiment, the management operation may also be performed according to a request from the external device.

The controller 120 may use the first sub-areas SB1 before the second sub-areas SB2 in order to store data in the memory device 110. The controller 120 may use only the first sub-areas SB1 in order to store a first type of data in the memory device 110.

According to an embodiment, the first type of data may include data selected according to a request from the external device. The first type of data may include data recovered after an error occurs. The first type of data may include data to be quickly stored in the memory device 110.

Figure 2:
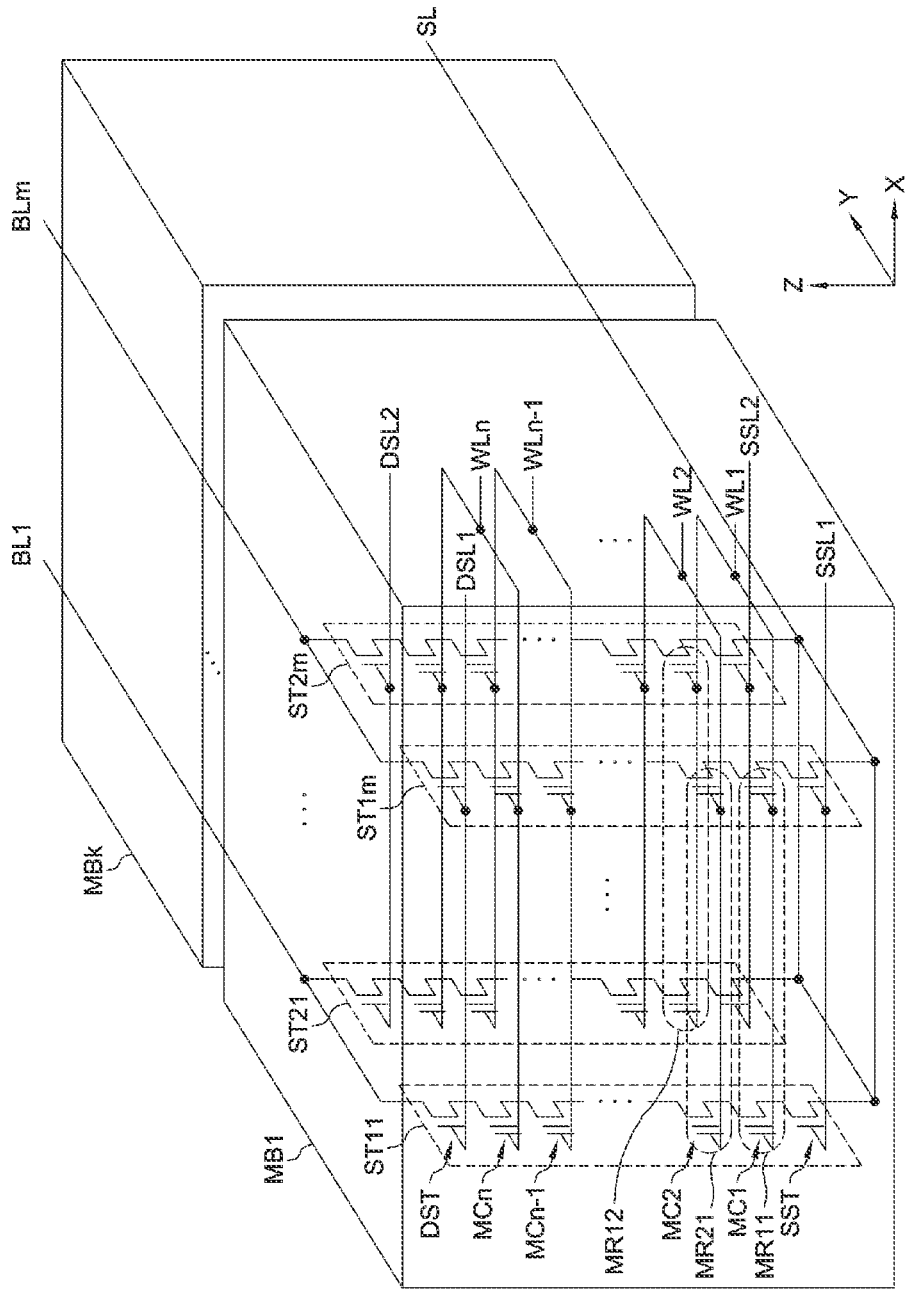
FIG. 2 is a circuit diagram illustrating a memory block in accordance with an embodiment of the present disclosure.

FIG. 2 is a circuit diagram illustrating a memory block MB1 in accordance with an embodiment of the present disclosure. Each of the memory blocks MB in FIG. 1 may be configured similarly to the memory block MB1 in FIG. 2.

Referring to FIG. 2, the memory block MB1 may include strings ST11 to ST1$m$ and ST21 to ST2$m$. Each of the strings ST11 to ST1$m$ and ST21 to ST2$m$ may extend in a vertical direction (Z direction). In the memory block MB1, m strings may be arranged in a row direction (X direction). FIG. 2 illustrates that two strings are arranged in a column direction (Y direction), but this is for convenience of description and three or more strings may be arranged in the column direction (Y direction).

The strings ST11 to ST1$m$ and ST21 to ST2$m$ may have substantially the same configuration. For example, the string ST11 may include a source select transistor SST, memory cells MC1 to MCn, and a drain select transistor DST connected in series to one another between a source line SL and a bit line BL1. A source of the source select transistor SST may be connected to the source line SL, and a drain of the drain select transistor DST may be connected to the bit line BL1. The memory cells MC1 to MCn may be connected in series to one another between the source select transistor SST and the drain select transistor DST.

Gates of source select transistors of strings arranged in substantially the same row may be connected to substantially the same source select line. For example, gates of the source select transistors of the strings ST11 to ST1$m$ of a first row may be connected to a source select line SSL1. Gates of the source select transistors of the strings ST21 to ST2$m$ of a second row may be connected to a source select line SSL2. In another embodiment, the source select transistors of the strings ST11 to ST1$m$ and ST21 to ST2$m$ may be connected in common to one source select line.

Gates of drain select transistors of strings arranged in substantially the same row may be connected to substantially the same drain select line. For example, gates of the drain select transistors of the strings ST11 to ST1$m$ of the first row may be connected to a drain select line DSL1. Gates of the drain select transistors of the strings ST21 to ST2$m$ of the second row may be connected to a drain select line DSL2.

Strings arranged in substantially the same column may be connected to substantially the same bit line. For example, the strings ST11 and ST21 of a first column may be connected to the bit line BL1. The strings ST1$m$ and ST2$m$ of an $m^{th}$ column may be connected to a bit line BLm.

Gates of memory cells located at substantially the same position in the vertical direction may be connected to substantially the same word line. For example, in the strings ST11 to ST1$m$ and ST21 to ST2$m$, memory cells located at substantially the same position in the vertical direction as the memory cell MC1 may be connected to a word line WL1.

Among the memory cells, memory cells connected to substantially the same word line in substantially the same row may constitute one memory area. For example, memory cells connected to the word line WL1 in the first row may constitute one memory area MR11. Memory cells connected to the word line WL1 in the second row may constitute one memory area MR12. Memory cells connected to the word line WL2 in the first row may constitute one memory area MR21. Each word line may be connected to a plurality of memory areas according to the number of rows. Memory cells constituting one memory area may be programmed simultaneously.

According to an embodiment, the memory block MB1 may further include dummy memory cells further connected to one or more dummy word lines other than the word lines WL1 to WLn and connected to the dummy word lines.

Figure 3:
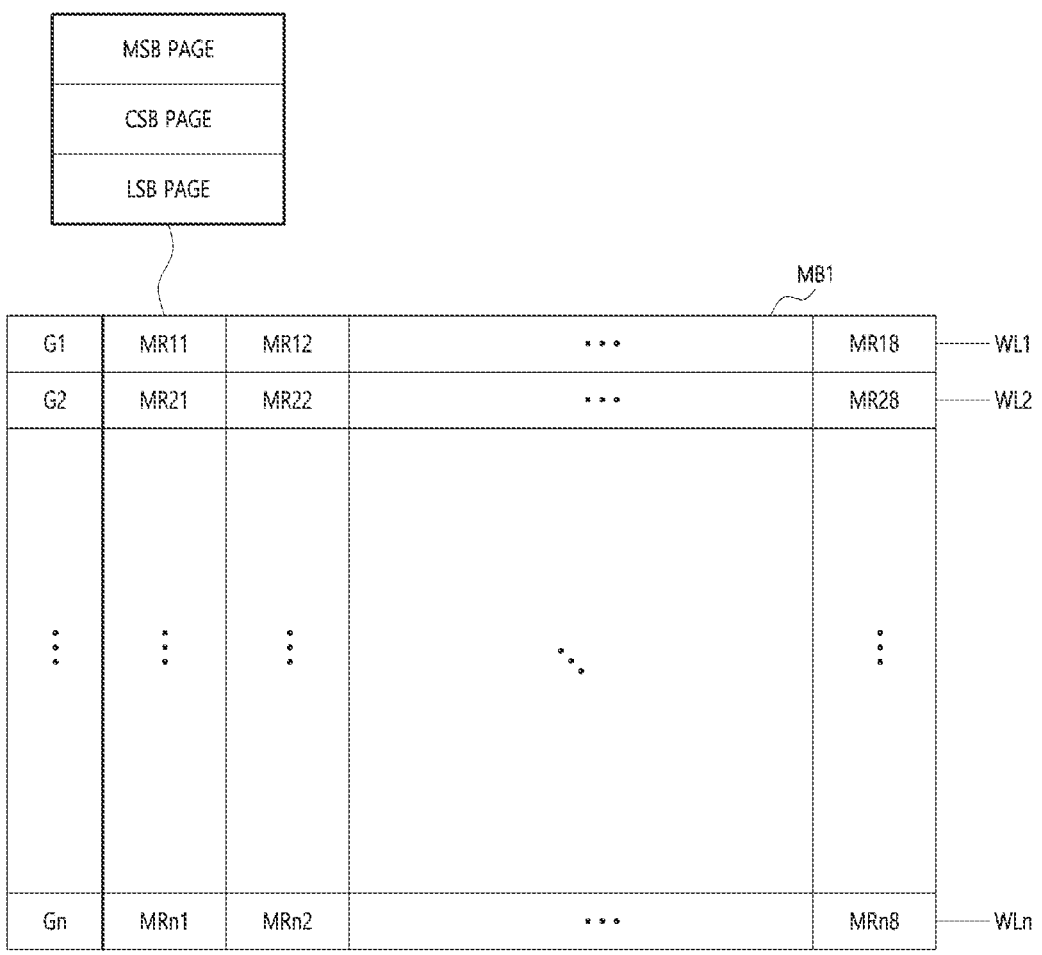
FIG. 3 is a simplified diagram illustrating memory areas included in the memory block in accordance with an embodiment of the present disclosure.

FIG. 3 is a simplified diagram illustrating memory areas MR11 to MRn8 included in the memory block MB1 in accordance with an embodiment of the present disclosure. Each of the memory blocks MB in FIG. 1 may be configured similarly to a memory block MB1 in FIG. 3. The memory areas MR11 to MRn8 may be memory areas included in the memory block MB1 in FIG. 2.

Referring to FIG. 3, the memory block MB1 may include the memory areas MR11 to MRn8. The memory areas MR11 to MRn8 may be grouped into groups G1 to Gn. The groups G1 to Gn may be connected to the word lines WL1 to WLn, respectively. Each of the groups G1 to Gn may include eight memory areas connected to substantially the same word line. For example, the first group G1 may include the memory areas MR11 to MR18 connected to the word line WL1. The fact that the number of memory areas included in each of the groups G1 to Gn is 8 may be an example. The eight memory areas connected to substantially the same word line and forming one group may be selectively accessed by controlling respectively corresponding source select lines and a corresponding word line.

Each of the memory areas MR11 to MRn8 may include a plurality of memory cells connected to substantially the same word line. For example, the memory area MR11 may include a plurality of memory cells connected to the word line WL1, and the memory area MR21 may include a plurality of memory cells connected to the word line WL2.

The order of writing may refer to an order in which a write operation is performed on the memory areas MR11 to MRn8. For example, the write operation may be performed on the first group G1 from the memory area MR11 to the memory area MR18, may be performed on the second group G2 in substantially the same order, and then may be performed on each of the remaining groups G3 to Gn in substantially the same order. However, depending on the embodiment, the order of writing may be different from that described above.

When k bits are stored per memory cell, one memory area constituted by the memory cells may logically include k sub-areas, for example, pages. When the memory cell is a triple level cell (TLC) in which 3 bits are stored per memory cell, the memory area MR11 may logically include three pages, that is, a least significant bit (LSB) page (or lowest level page) where LSB is stored, a central significant bit (CSB) page (or middle level page) where CSB is stored, and a most significant bit (MSB) page (or highest level page) where MSB is stored.

Figure 4:
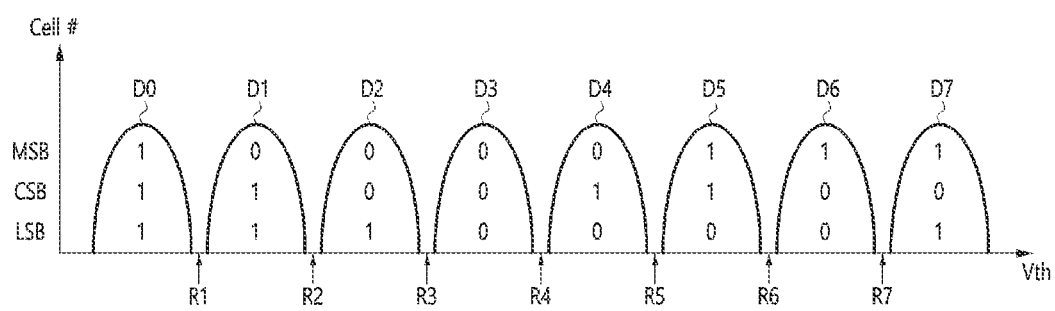
FIG. 4 is a simplified diagram for describing threshold voltage distributions of memory cells in accordance with an embodiment of the present disclosure.

FIG. 4 is a simplified diagram for describing threshold voltage distributions D0 to D7 of memory cells in accordance with an embodiment of the present disclosure. A horizontal axis Vth may indicate threshold voltages of the memory cells, and a vertical axis Cell # may indicate the number of memory cells each having a corresponding threshold voltage.

Referring to FIG. 4, for example, TLC memory cells may form the threshold voltage distributions D0 to D7 according to stored data. Memory cells forming the threshold voltage distributions D0 to D7 may be, for example, memory cells included in one of the memory areas MR11 to MRn8 in FIG. 3. In a write operation, each memory cell may be controlled to form one of the eight threshold voltage distributions D0 to D7 according to 3-bit data to be stored therein. For example, a memory cell in which data "111" is stored may form the threshold voltage distribution D0. According to an embodiment, when k bits are stored per memory cell, the memory cells may form $2^k$ threshold voltage distributions.

When a read voltage is applied to a memory cell through a word line to which the memory cell is connected, the memory cell may be turned on/off according to its threshold voltage. Specifically, the memory cell may be turned on when a read voltage higher than its threshold voltage is applied thereto, and may be turned off when a read voltage lower than its threshold voltage is applied thereto. The memory cell may induce different currents when it is turned on and when it is turned off, and the memory device 110 may determine whether the threshold voltage of the memory cell is higher or lower than the read voltage by sensing such currents. Accordingly, when each of read voltages R1 to R7 located between the threshold voltage distributions D0 to D7 (or valleys) is applied to the memory cell, the memory device 110 may determine whether the threshold voltage of the memory cell is higher or lower than each of the read voltages R1 to R7. As a result, the memory device 110 may determine a threshold voltage distribution formed by the memory cells using the read voltages R1 to R7 and read data stored in the memory cells.

For example, LSB data stored in the LSB page may be read using the read voltages R3 and R7. That is, when the memory cell has a threshold voltage lower than the read voltage R3 or higher than the read voltage R7, LSB "1" may be read from the memory cell. Furthermore, when the memory cell has a threshold voltage higher than the read voltage R3 and lower than the read voltage R7, LSB "0" may be read from the memory cell. In a similar principle, CSB data stored in the CSB page may be read using the read voltages R2, R4, and R6. MSB data stored in the MSS page may be read using the read voltages R1 and R5.

The larger the number of threshold voltage distributions, the longer the execution time of the write operation. The reason for this is because, the larger the number of threshold voltage distributions, the narrower the interval between the threshold voltage distributions, so finely adjusting the threshold voltage of the memory cells may be a complicated process. Accordingly, a memory block including single level cells (SLCs) forming only two threshold voltage distributions may be used as a buffer because a write operation may be performed quickly.

Figure 5:
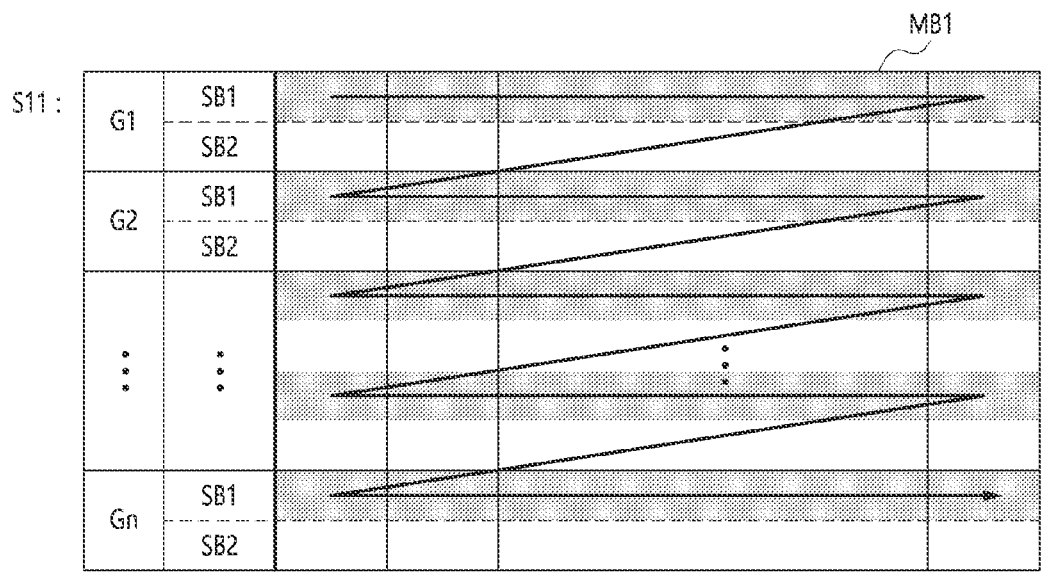
FIG. 5 is a simplified diagram illustrating a method of storing data in a memory block in accordance with an embodiment of the present disclosure.
Figure 5:
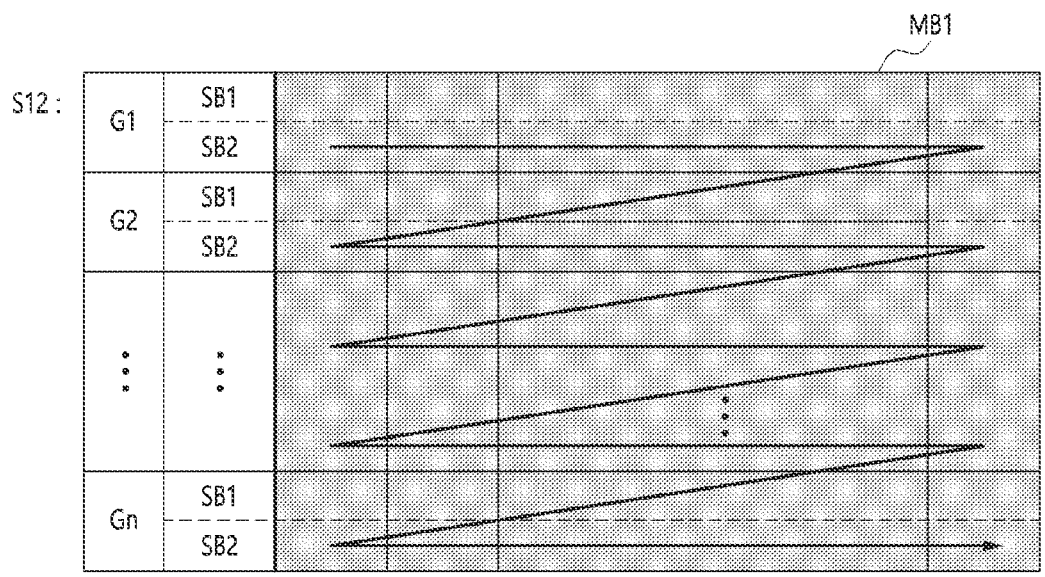

FIG. 5 is a simplified diagram illustrating a method of storing data in the memory block MB1 in accordance with an embodiment of the present disclosure.

Referring to FIG. 5, the controller 120 may first use the first sub-areas SB1 included in the memory block MB1, as in an operation S11 in order to store data in the memory block MB1, and then use the second sub-areas SB2 included in the memory block MB1, as in an operation S12. The first sub-areas SB1 may be lower-level sub-areas than the second sub-areas SB2. For example, when the memory block MB1 is a TLC memory block, the first sub-areas SB1 may be LSB pages and the second sub-areas SB2 may be CSB pages and MSB pages. In another example, when the memory block MB1 is a TLC memory block, the first sub-areas SB1 may be LSB pages and CSB pages and the second sub-areas SB2 may be MSB pages.

Specifically, in the operation S11, the controller 120 may perform a first write operation on the first sub-areas SB1, included in the memory block MB1 according to the order of writing. The first write operation may be an operation for storing data in a number of first sub-areas SB1 included in each memory area. That is, the first write operation may be an operation for storing 'a' number of low-level bits per memory cell. The 'a' may be a natural number equal to or greater than 1.

In the operation S12, the controller 120 may perform a second write operation on the second sub-areas SB2 included in the memory block MB1 according to the order of writing. The second write operation may be an operation for storing data in 'b' number of second sub-areas SB2 included in each memory area. That is, the second write operation may be an operation for storing 'b' number of high-level bits per memory cell. The 'b' is a natural number equal to or greater than 1, and the sum of 'a' and 'b' may be the total number of bits stored per memory cell.

The execution time of the first write operation on one memory area may be shorter than the execution time of the second write operation. For example, when the memory cell is a TLC, the second write operation needs be performed to form all the eight threshold voltage distributions D0 to D7 illustrated in FIG. 4. Therefore, the second write operation may undergo a more complicated and detailed process and take a long time to perform. However, in a case where the first write operation is for storing LSB data in each memory cell, it may be sufficient if the first write operation is performed so that the memory cell has a larger threshold voltage than the read voltage R3 when the LSB data is 0 and has a smaller threshold voltage than the read voltage R3 when the LSB data is 1. Accordingly, the first write operation may be performed simpler and faster than the second write operation.

As illustrated in FIG. 5, the second sub-areas SB2 may be used after all the first sub-areas SB1 of the memory block MB1 store data. However, according to an embodiment, the second sub-areas SB2 may also be used after a predetermined number of first sub-areas SB1 in the memory block MB1 store data.

Figure 6:
FIG. 6 is a simplified diagram illustrating a method of storing data in a memory block according to the type of data in accordance with an embodiment of the present disclosure.
Figure 6:

FIG. 6 is a simplified diagram illustrating a method of storing data in the memory block MB1 according to the type of data in 1o accordance with an embodiment of the present disclosure.

Referring to FIG. 6, the first sub-areas SB1 of the memory block MB1 may be used in order to store a first type of data D1. The controller 120 may determine the type of data to be stored in the memory device 110, and when the data is determined as the first type of data D1, the controller 120 may store the first type of data D1 in the first sub-areas SB1 of the memory block MB1. The first type of data D1 may include data to be quickly stored in the memory device 110. The first type of data D1 may include data recovered after an error occurs, data to be immediately stored according to a request from the external device, and the like. The first type of data D1 may be referred to as low latency data.

The second sub-areas SB2 of the memory block MB1 may be used in order to store a second type of data D2. The controller 120 may determine the type of data to be stored in the memory device 110, and when the data is determined as the second type of data D2, the controller 120 may store the second type of data D2 in the second sub-areas SB2 of the memory block MB1. The second type of data D2 may include data that does not need to be quickly stored in the memory device 110. The second type of data D2 may include data other than the first type of data D1. The second type of data D2 may be referred to as high latency data. Storing the first type of data D1 in the first sub-areas SB1 and storing the second type of data D2 in the second sub-areas SB2 may follow the method described with reference to FIG. 5.

According to the present disclosure, data stability may be quickly secured by quickly storing the first type of data D1, which is to be stored quickly, in the first sub-areas SB1. Furthermore, when the memory device 110 includes an SLC memory block (hereinafter, referred to as an SLC buffer) used as a buffer, the first type of data D1 may be quickly stored in the memory block MB1 even though it is not stored in the SLC buffer. In such a case, since the process of moving the first type of data D1 from the SLC buffer to the memory block MB1 is also unnecessary, the performance of the controller 120 may be improved. Furthermore, since the use of the SLC buffer is also reduced, the utilization of the memory device 110 may increase.

Figure 7:
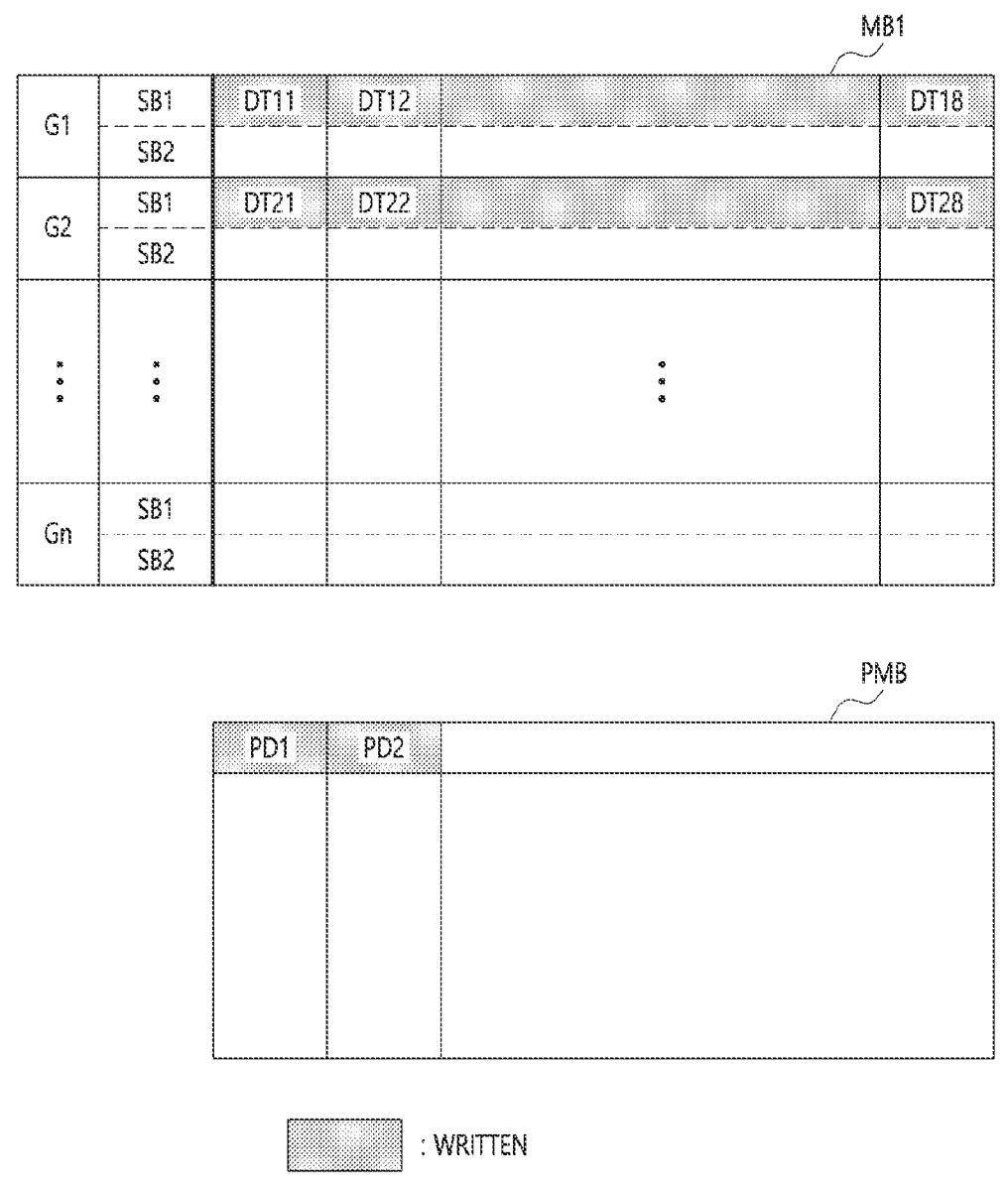

FIG. 7 is a simplified diagram illustrating a method of managing parity data in accordance with an embodiment of the present disclosure.

Referring to FIG. 7, the controller 120 may generate parity data for data stored in the first sub-areas SB1 for each of the groups G1 to Gn. For example, the controller 120 may generate parity data PD1 for data DT11 to DT18 stored in the first sub-areas SB1 of the first group G1, and store the parity data PD1 into a memory block PMB (hereinafter, a parity memory block). Similarly, the controller 120 may generate parity data PD2 for data DT21 to DT28 stored in the first sub-areas SB1 of the second group G2, and store the parity data PD2 in the parity memory block PMB.

According to an embodiment, the parity memory block PMB may be an SLC memory block, and thus parity data may be quickly stored in the SLC memory block. According to an embodiment, the parity memory block PMB may be a memory block such as a TLC other than an SLC memory block, and parity data may be stored in the first sub-areas of the parity memory block PMB in order to be quickly stored in the parity memory block PMB.

According to an embodiment, when the data previously stored in the first sub-areas SB1 is affected and damaged by the second write operation on the second sub-areas SB2 of the memory block MB1, the parity data may be used in order to recover the damaged data. For example, the controller 120 may use the parity data PD1 corresponding to the first group G1 in order to recover an error occurring in the data DT11 to DT18 of the first group G1. When all second sub-areas SB2 of the memory block MB1 store data (that is, when the memory block MB1 is closed), parity data stored in the parity memory block PMB does not need to be substantially maintained and thus may be erased.

According to an embodiment, the controller 120 may also generate parity data by a parity unit different from that described with reference to FIG. 7. The parity unit may be a set of data sharing substantially the same parity data. In FIG. 7, the parity unit may be a set of data stored in the first sub-areas SB1 included in substantially the same group. That is, data may constitute one parity unit DT11 to DT18. According to an embodiment, the controller 120 may also set a set of data stored in all first sub-areas SB1 of the memory block MB1, by the parity unit.

Figure 8A:
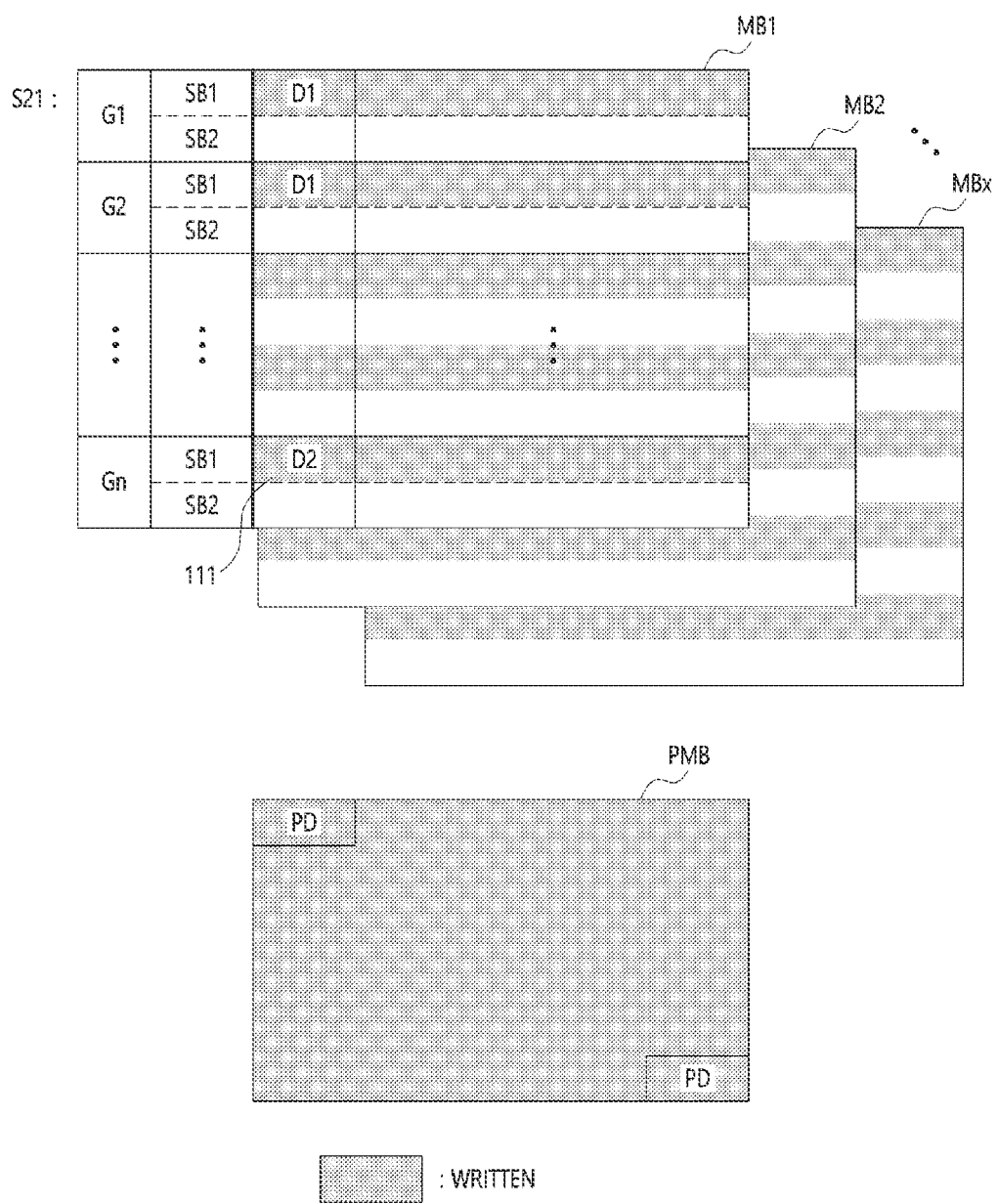
FIG. 8A and FIG. 8B are diagrams for describing a first number in accordance with an embodiment of the present disclosure.
Figure 8B:
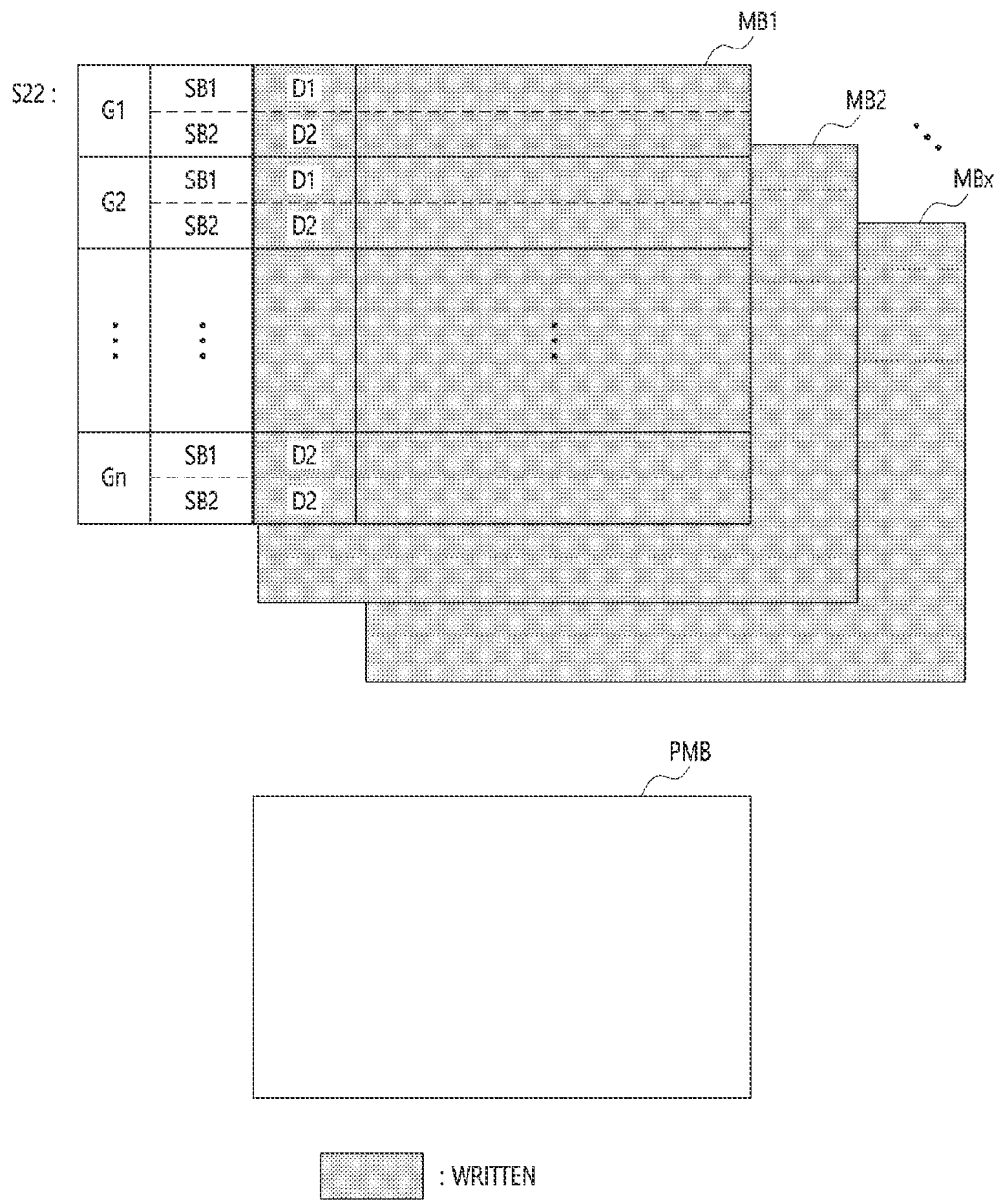

FIG. 8A and FIG. 8B are diagrams for describing a first number in accordance with an embodiment of the present disclosure.

Referring to FIG. 8A, an operation S21 may be an operation in which the number of memory blocks MB1 to MBx under a first condition has reached the first number. In the memory block under the first condition, all first sub-areas SB1 may store data and all second sub-areas SB2 may be empty. Before the number of memory blocks under the first condition reaches the first number, the controller 120 may not store data in the second sub-areas SB2 included in the memory blocks under the first condition.

Specifically, the controller 120 may store the first type of data D1 in the first sub-areas SB1 of the memory block MB1, and store parity data PD in the parity memory block PMB as described with reference to FIG. 7. After the controller 120 uses only all first sub-areas SB1 of the memory block MB1 in order to store the first type of data D1, all first sub-areas of the memory block MB2 may also be similarly used. The controller 120 may sequentially use the first number of memory blocks MB1 to MBx to store the first type of data D1. The controller 120 may not store data in the second sub-areas SB2, which are included in the first number of memory blocks MB1 to MBx, until all first sub-areas SB1 included in the first number of memory blocks MB1 to MBx store data.

The first number may mean the minimum number of memory blocks MB1 to MBx under the first condition, which need exist in order to use the second sub-areas SB2. The first number may mean the number of memory blocks which need to store data in the first sub-areas SB1 so that there is no more empty space in the parity memory block PMB. Namely, when the number of memory blocks MB1 to MBx under the first condition reaches the first number, the parity memory block PMB may be filled with the parity data PD. According to an embodiment, the first number may be a quotient obtained by dividing the size of the parity unit by the size of the parity data PD corresponding to the parity unit. For example, when the parity unit is 8 MB and 1 MB of parity data is generated for each 8 MB of data, the first number may be 8.

According to an embodiment, when the first number is set, the controller 120 may store data in the first sub-areas SB1 regardless of the data type in order to maximize the operation performance. For example, the controller 120 may store even the second type of data D2 in a first sub-area 111.

Referring to FIG. 8B, in a subsequent operation S22, after all first sub-areas SB1 included in the first number of memory blocks MB1 to MBx store data, the controller 120 may store the second type of data D2 in the second sub-areas SB2 of the memory blocks MB1 to MBx. When all second sub-areas SB2 of the memory blocks MB1 to MBx store data, the parity data PD stored in the parity memory block PMB does not need to be substantially maintained any longer and may be erased.

According to the present disclosure, the capacity of the memory device 110 may be secured by rapidly converting the parity memory block PMB into a free memory block while effectively reducing the execution time of a write operation.

Figure 9A:
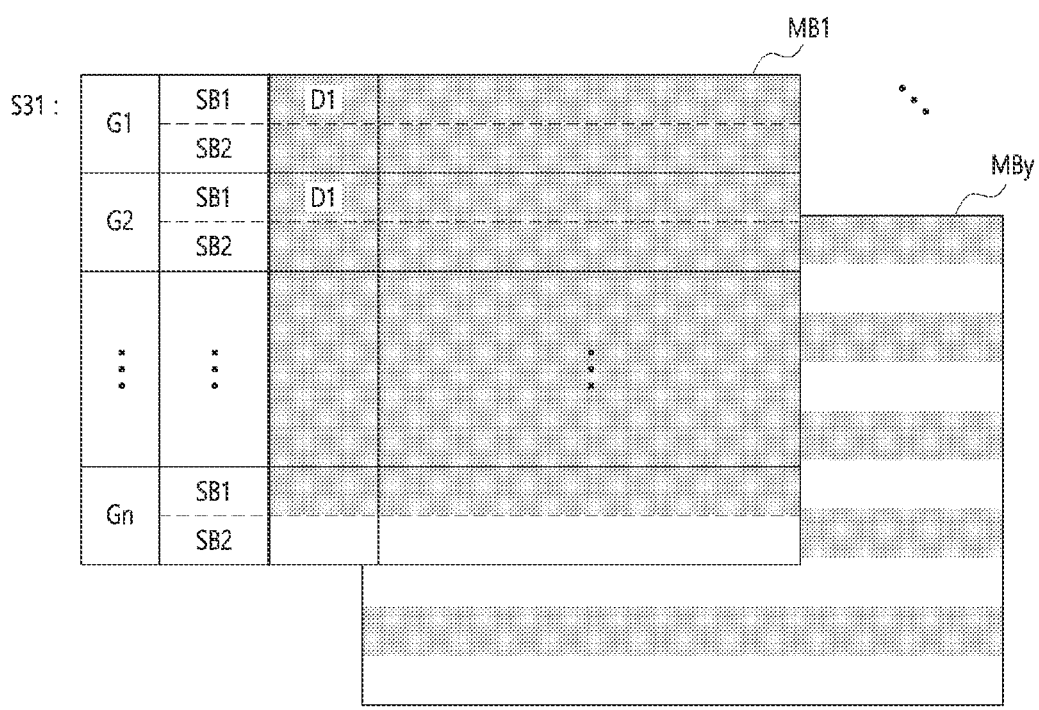
FIG. 9A and FIG. 9B are diagrams for describing a second number in accordance with an embodiment of the present disclosure.
Figure 9A:
Figure 9B:
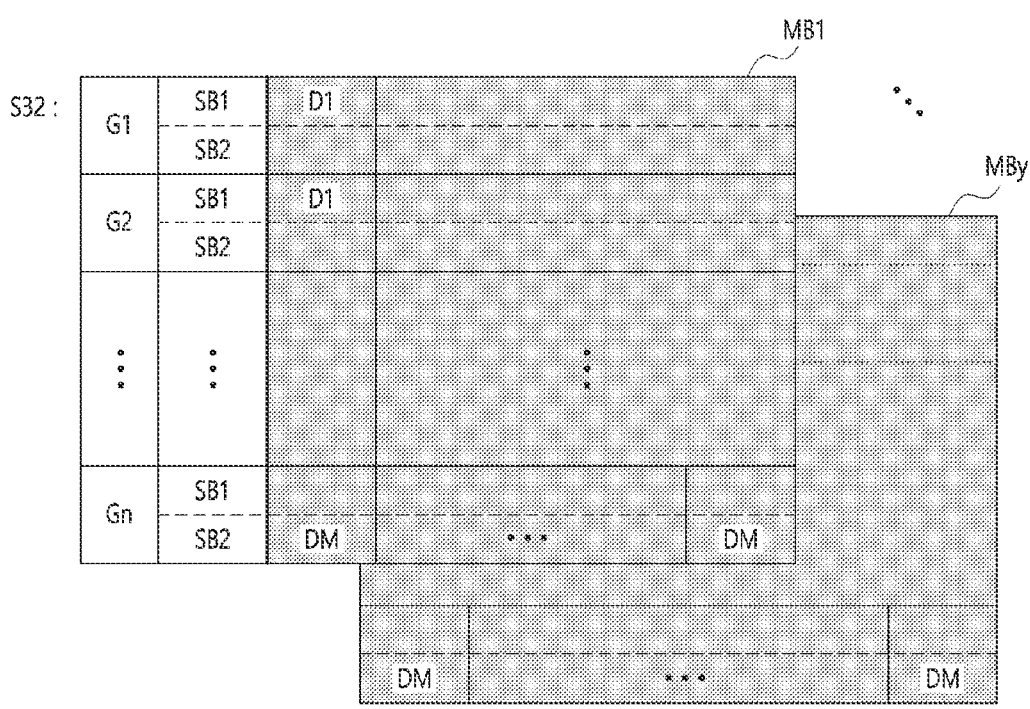
Figure 9B:

FIG. 9A and FIG. 9B are diagrams for describing a second number in accordance with an embodiment of the present disclosure.

Referring to FIG. 9A, an operation S31 may be an operation in which the number of memory blocks MB1 to MBy under a second condition has reached the second number. In the memory block under the second condition, all first sub-areas SB1 may store data but at least some of the second sub-areas SB2 may be empty. The second number may mean the maximum allowable number of memory blocks MB1 to MBy under the second condition. The second number may be set to a value capable of maximizing the operation performance through a test. The second number may be equal to or greater than the first number. The controller 120 may determine that the number of memory blocks MB1 to MBy under the second condition has reached the second number.

Accordingly, referring to FIG. 9B, in an operation S32, the controller 120 may store dummy data in the second sub-areas SB2 of the memory blocks MB1 to MBy so that the second number of memory blocks MB1 to MBy are closed. According to an embodiment, the controller 120 may also store dummy data in the second sub-areas SB2 of some memory blocks so that only some of the second number of memory blocks MB1 to MBy are closed.

According to an embodiment, in order for the memory blocks MB1 to MBy, which are closed by storing the dummy data, to quickly become free memory blocks, the controller 120 may assign a priority to the closed memory blocks MB1 to MBy as victim blocks of a garbage collection operation.

According to an embodiment, when it is determined that the number of memory blocks MB1 to MBy under the second condition has reached the second number and there is no event to store the second type of data D2 in the memory device 110 for a predetermined time, the controller 120 may store dummy data in the second sub-areas SB2 of at least some of the second number of memory blocks MB1 to MBy. According to an embodiment, when the first type of data D1 needs to be continuously stored in the memory device 110 even after the number of memory blocks MB1 to MBy under the second condition reaches the second number, the controller 120 may store dummy data in the second sub-areas SB2 of at least some of the second number of memory blocks MB1 to MBy.

According to the present disclosure, the capacity of the memory device 110 may be secured by appropriately inducing closing of a memory block under a second condition for a garbage collection operation while effectively reducing the execution time of a write operation.

The above description is merely intended to illustratively describe the technical spirit of the present disclosure, and various changes and modifications can be made by those skilled in the art to which the present disclosure pertains without departing from the essential features of the present disclosure. Therefore, the embodiments disclosed in the present disclosure are not intended to limit the technical spirit of the present disclosure, but are intended to describe the present disclosure. The scope of the technical spirit of the present disclosure is not limited by these embodiments. The scope of the present disclosure should be interpreted by the accompanying claims and all technical spirits falling within the equivalent scope thereto should be interpreted as being included in the scope of the present disclosure. Furthermore, the embodiments may be combined to form additional embodiments.

What is claimed is:

1. A storage device comprising:
    a memory device including one or more memory blocks including first sub-areas and second sub-areas configured to store higher level data than the first sub-areas; and
    a controller configured to use the first sub-areas before the second sub-areas in order to store data in the memory device,
    wherein the data stored in the first sub-areas includes data recovered after an error occurs therein.

2. The storage device according to claim 1, wherein the controller uses, when the data is a first type of data, only the first sub-areas in order to store the data.

3. The storage device according to claim 2, wherein the first type of data includes data selected according to a request from an external device.

4. The storage device according to claim 1, wherein the first sub-areas store least significant bit (LSB) data and the second sub-areas store most significant bit (MSB) data.

5. A storage device comprising:
- a memory device including a memory block including first sub-areas and second sub-areas having a higher level than the first sub-areas; and
- a controller configured to use only the first sub-areas in order to store a first type of data,
- wherein the first type of data includes data recovered after an error occurs therein.

6. The storage device according to claim 5, wherein the controller stores a second type of data in the second sub-areas.

7. The storage device according to claim 5, wherein the first sub-areas store least significant bit (LSB) data and the second sub-areas store most significant bit (MSB) data.

8. A storage device comprising:
- a memory device including a plurality of memory blocks each including first sub-areas and second sub-areas; and
- a controller configured to use, after a number of first memory blocks among the plurality of memory blocks reaches a first number, second sub-areas included in the first memory blocks to store high latency data therein,
- wherein, in each of the first memory blocks, first sub-areas are full of data stored therein and the second sub-areas are empty.

9. The storage device according to claim 8, wherein the controller is further configured to store data preferentially into the first sub-areas within the first memory blocks until the number of first memory blocks reaches the first number.

10. The storage device according to claim 8, wherein the controller is further configured to generate parity data for the data stored in the first sub-areas within the first memory blocks, store the parity data in a parity memory block among the plurality of memory blocks, and erase the parity data after the second sub-areas become full of data stored therein within the first memory blocks.

11. The storage device according to claim 8,
- wherein the controller is further configured to generate parity data for the data having a predetermined size and stored in the first sub-areas within one of the first memory blocks,
- wherein the first number is a quotient obtained by dividing the predetermined size by a size of the parity data.

12. The storage device according to claim 8,
- wherein the controller is further configured to close, when a number of second memory blocks among the plurality of memory blocks reaches a second number, a selected second memory block of the second memory blocks by storing dummy data into second sub-areas within the selected second memory block, and
- wherein, in each of the second memory blocks, first sub-areas are full of data stored therein and second sub-areas have an available storage space.

13. The storage device according to claim 12, wherein the second number is equal to or greater than the first number.

14. The storage device according to claim 8, wherein the controller is further configured to store low latency data preferentially into the first sub-areas within the first memory blocks.

* * * * *